United States Patent [19]

Lo et al.

[11] 4,384,802
[45] May 24, 1983

[54] DOUBLE I-BEAM STRUCTURAL JOINT FOR CONNECTING FIBER-REINFORCED PLASTIC BEAMS OR GIRDERS

[75] Inventors: King H. Lo; William G. Gottenberg, both of Houston, Tex.

[73] Assignee: Shell Oil Company, Houston, Tex.

[21] Appl. No.: 272,602

[22] Filed: Jun. 11, 1981

[51] Int. Cl.³ ............................................... F16B 7/00
[52] U.S. Cl. .................................... 403/231; 403/403; 52/657
[58] Field of Search ................. 52/657, 693, 694, 695, 52/697; 403/205, 403, 231, 217

[56] References Cited

U.S. PATENT DOCUMENTS

| | | | |
|---|---|---|---|
| 3,100,555 | 8/1963 | Ashton | 52/655 |
| 3,685,862 | 8/1972 | Rudolf | 403/390 X |
| 3,975,874 | 8/1976 | Witte et al. | 52/169.7 |
| 3,988,872 | 11/1976 | Adamson et al. | 403/217 X |
| 4,177,306 | 12/1979 | Schulz et al. | 52/309.1 X |

*Primary Examiner*—Andrew V. Kundrat

[57] ABSTRACT

Beams or girders composed of fiber-reinforced polymers or plastics can be adhesively bonded into structural members by means of an interconnecting joint of such material having an arch structure which is positioned and arranged so that it provides a flexibility that tends to reduce peel failures of the adhesive bonds between the joint and beams or girders.

4 Claims, 8 Drawing Figures

DOUBLE I-BEAM STRUCTURAL JOINT FOR CONNECTING FIBER-REINFORCED PLASTIC BEAMS OR GIRDERS

BACKGROUND OF THE INVENTION

This invention relates to structural joints for connecting fiber-reinforced plastic beams or girders without strength reducing bolts, grooves, or the like. More particularly, the invention relates to a double I-beam (DIB) joint for connecting fiber-reinforced plastic beams or girders into civil engineering structures.

Prior uses of fiber-reinforced polymers or plastics and the like plastic structures are believed to be typified by patents such as the following: U.S. Pat. No. 3,100,555 describes a tower structure composed of tubular plastic structural members joined by segmented plastic joints which are glued together to interconnect the intersecting braces, legs, etc. U.S. Pat. No. 3,685,862 describes connectors for joining plastic rods within hoops in which the converging rod portions are squeezed together and held by driven-in wedges. U.S. Pat. No. 3,975,874 describes a prefabricated plastic swimming pool design which proposes side and shoulder portions supported by X-shaped molded plastic braces having I-beam cross-sections along some portions and flat cross-sections in other locations. U.S. Pat. No. 4,177,306 describes laminated plastic girders in which some of the fiber-reinforcing materials extend into both of the girders.

SUMMARY OF THE INVENTION

The present invention relates to a structural joint or connector for joining intersecting fiber-reinforced plastic structural beams or girders. The present connector contains a double I-beam in the form of an arch-like structure in which a web portion is bounded by, respectively, a pair of substantially concentric arcuate flanges and a pair of converging generally flat flanges. The generally flat flange portions extend at least somewhat beyond each side of the web portion in the form of T-beams in which relatively short and outwardly decreasing tapered portions are parallel to the web portion of the DIB joint. The present connector is sized and shaped so that, in a completed structural joint, the generally flat flanges contact and substantially parallel adjacent faces or sides of the beams being interconnected with the arch-like portion located away from the point of intersection of those beams. And, in the completed structural joint the generally flat flanges of the DIB joint are adhesively bonded to the adjacent faces of the interconnected beams.

Where desirable, the strength of a structural joint in which beams or girders are interconnected by a DIB joint can be increased by adhesively bonding a generally flat plate between the contiguous portions of such beams. And, additionally, or alternatively, where such beams are I-beams, the strength of the connection can be increased by adhesively bonding C-shaped plastic clamps over the contiguous portions of the I-beam flanges and DIB joint flanges.

DESCRIPTION OF THE INVENTION

A main obstacle to the use of fiber-reinforced polymers as structural members has been the difficulty of interconnecting such members to form a primary load-carrying structure. In fact, the key to the performance of nearly all composite structures composed of fiber-reinforced plastics lies in joint design and technology. The lack of an efficient structural joint design has delayed the potentially large scale application of such plastics in the building industry. The conventional methods of joining such members, particularly in civil engineering structures, have relied on fasteners such as bolts and rivets of the type commonly used with steel structures. Such discrete fastening devices limit the strength of a joint to much less than the strength capability of the fiber-reinforced polymer members which are interconnected.

It has now been discovered that a joint which uses a fiber-reinforced plastic arch structure located away from the point of intersection of structural members and attached to the structural members by adhesive bonding avoids many of the disadvantages of the previously used methods for reinforced polymer members. An important feature of the present joint structure is that its flexibility at the adhesive bond location is graduated along the bond length in a manner which reduces the tendency for peel failures in the adhesive bond.

Figure 1:
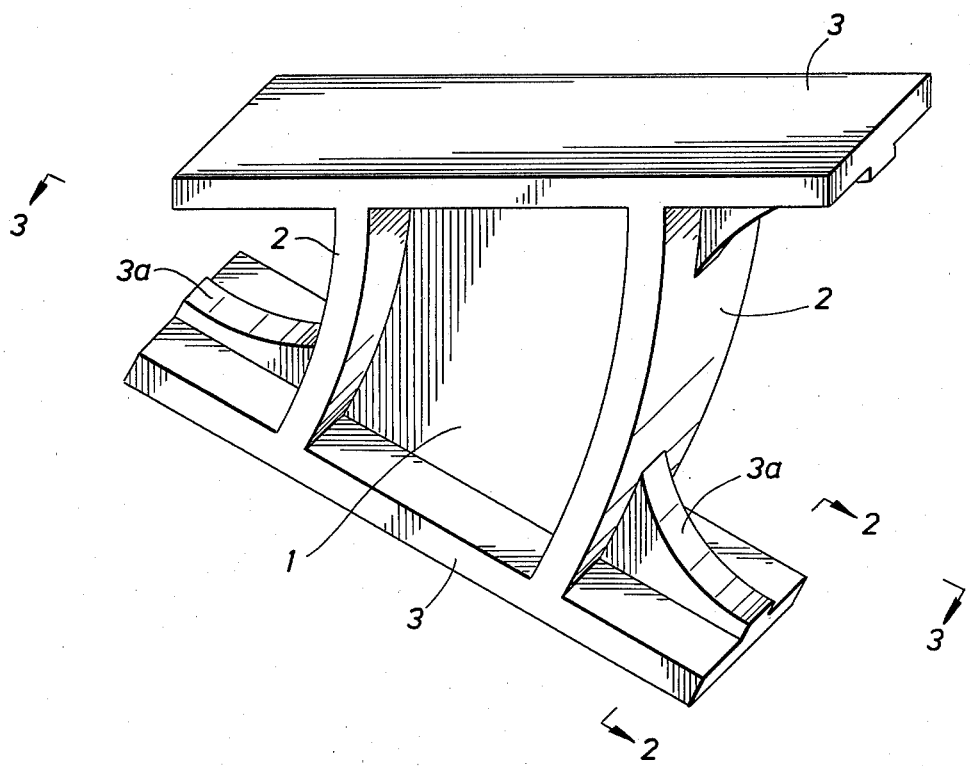
FIG. 1 is a schematic illustration of the present DIB joint.
Figure 2:
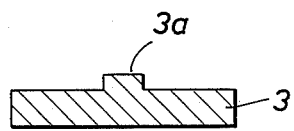
FIGS. 2 and 3 are cross-sections A—A and B—B of FIG. 1.
Figure 3:
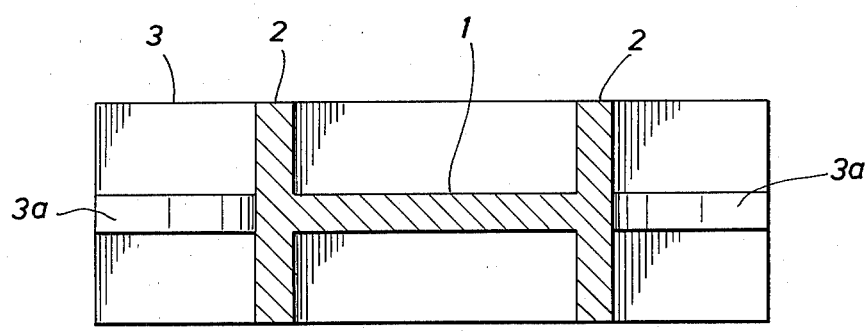

FIGS. 1-3 show the present double I-beam or DIB joint, or connector element. Such a connector contains an arch-shaped web 1 bounded by a pair of arcuate flanges 2 and a pair of generally flat flanges 3. The generally flat flanges preferably have end portions which extend beyond the edge of the web in the form of tapered T-beams. In a DIB joint in which the flat flanges are terminated by T-beam end portions, such as portions 3a, the maximum thickness of the webs of the terminal T-beam portions are preferably less than two-times the widths of the flat flanges, and the flat flange-widths are preferably substantially constant throughout the joint. The minimum thickness of such terminal T-beam webs can be zero and their lengths and the slopes of their tapering (which can be constant or variable) are preferably correlated with the design requirements. The shapes and dimensions of all such end portions are preferably the same on each joint.

Where desirable, the outer surfaces of the generally flat flanges 3 can be shaped to conform to the shape of the beam to which it is to be attached, e.g., by adding an arcuate outer surface to conform to at least some of the adjacent portion of a tubular beam, or the like.

The DIB joint relies on adhesive bonding for load transfer from one member to the other. Since this increases the flexibility of the joint, particularly at the T-beam end sections of the flat flanges, it minimizes the tendency of the joint to fail due to adhesive peeling.

The disadvantage of using mechanical fasteners such as bolts or rivets in connections for fiber-reinforced structures has been described in publications such as "Mechanics of Composite Materials" by R. M. Jones, McGraw-Hill Rock Company, 1975; "Analysis of Discontinuities, Edge Effects and Joints" by G. C. Grimes and L. F. Greenman, Composite Materials, edited by L. J. Brautman and R. H. Krock, Academic Press, 1975.

Figure 4:
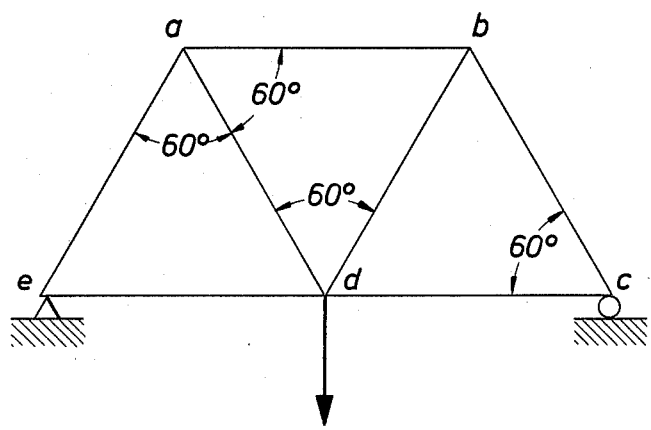
FIG. 4 shows a simple truss structure exemplification of a civil engineering type structure for which the present invention is useful.

FIG. 4 schematically illustrates a simple truss structure in which the present DIB joints can be used. Such a truss structure can be, for example one of two load-carrying trauss panels of a simple bridge configuration. The DIB joints can be used to connect all members of the exemplified truss structure. All parts of such a structure, including the joint and truss members, can be made of fiber-reinforced plastic.

In general, the dimensions of the DIB joints are chosen according to the loading requirements at the various joint connections—and, such loading requirements can be determined by known types of structural analysis.

Figure 5:
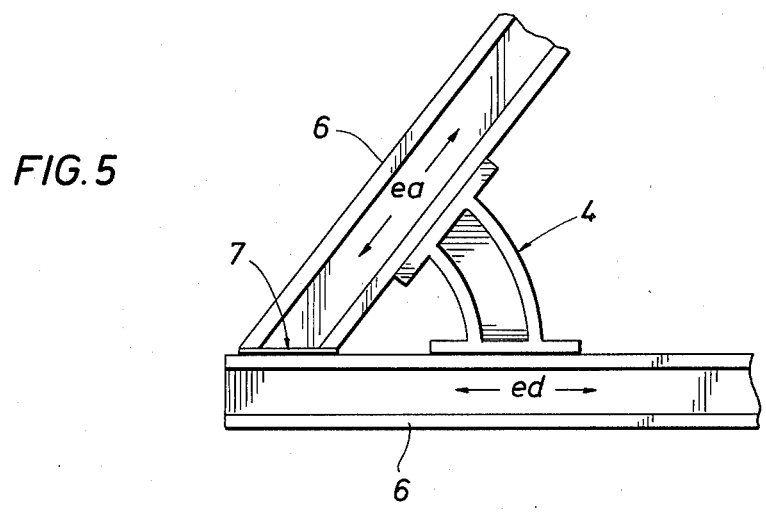
FIGS. 5, 6 and 7 show structural joints formed by using the present DIB joint to interconnect I-beams in the truss structure of FIG. 4.

FIG. 5 shows a connection of the members ea and ed at the joint e of the truss structure of FIG. 4. Where those members comprise I-beams 6 the flanges of the I-beams are connected to the flat flanges of the DIB joint 4 by adhesive bonding. This causes the load transfer from one member to another via adhesive bonding through the DIB joint. A generally flat plate 7 is preferably adhesively bonded between the intersecting portions of the beams being joined, such as beams 6. Such plates should, of course, be shaped to conform to any non-flat portions of the intersecting beam surfaces.

Figure 6:
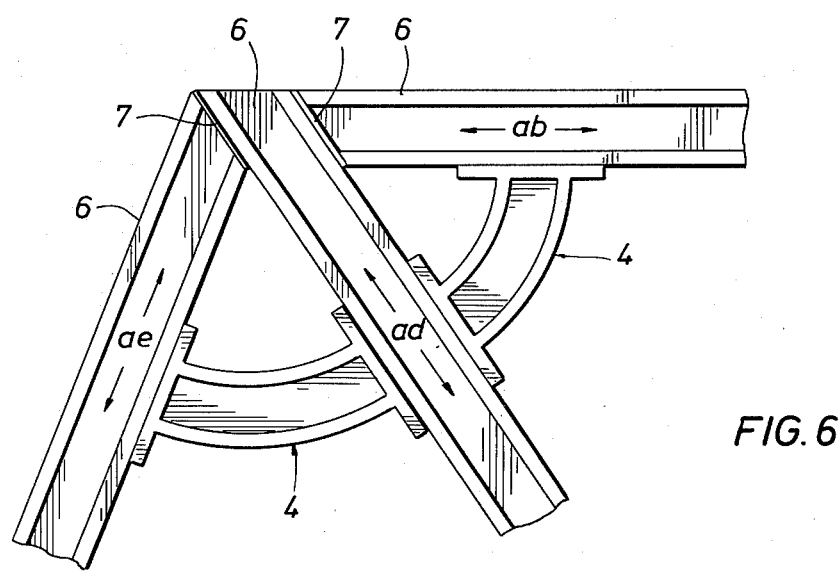

FIG. 6 shows the connection arrangement at joint a of the structure of FIG. 4. As shown, the arcuate flange portions of the two adjacent DIB joints are arranged to lie approximately in the arc of a circle. This tends to eliminate any eccentricity in the normal loads acting on the two flanges of a member such as the member ad.

Figure 7:
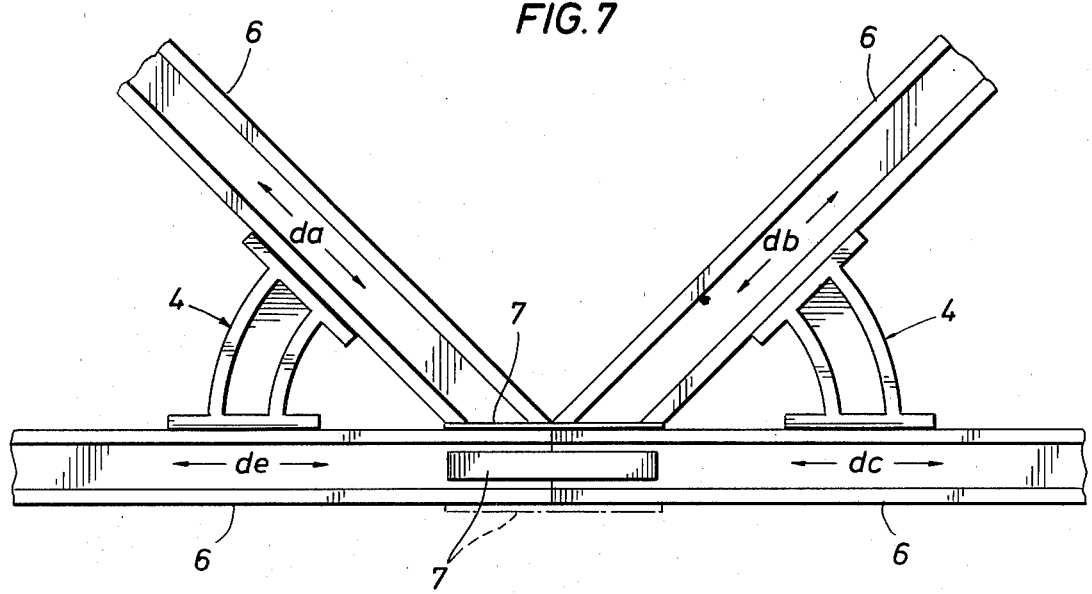

FIG. 7 shows the joint connection at joint d of the structure shown in FIG. 4. In addition to the DIB joints, lap joints (preferably double lap joints) formed by attaching plates 7 can be used to connect the webs of members de and dc; and if desired, to connect the flanges of those members. A dashed line was used to depict the lower plate on the flanges since the effect of that plate was not used in the stress calculations described herein.

Figure 8:
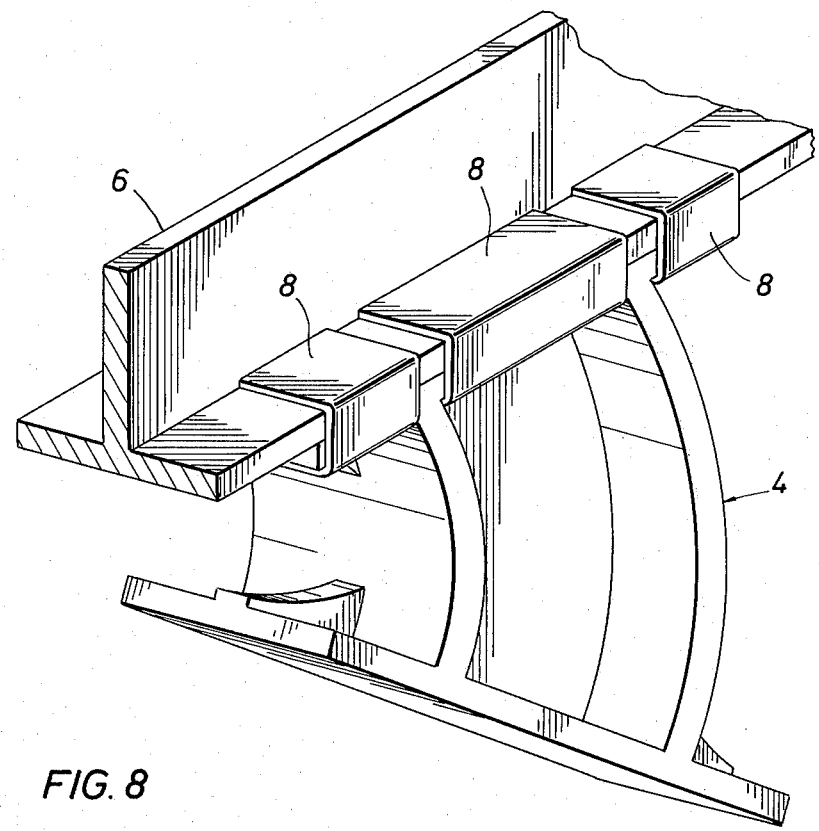
FIG. 8 shows a use of C-clamps in a structural joint in which a DIB joint adjoins an I-beam.

FIG. 8 shows the use of C-clamps 8 connected over the contiguous flanges of an I-beam 6 and a DIB joint 4. Such fiber-reinforced C-clamps provide an additional load transfer. Such clamps are also useful in holding the members together during the construction process. In addition, such C-clamps provide resistance against peeling of the adhesive bond between the flanges of the I-beam and DIB joint.

The joint connection at joints b and c are similar to those at joints a and e. It should be noted again that only adhesive bonding is used to connect the various members of the truss structure. Although the fiber-reinforced C-clamps behave like mechanical fasteners, they are actually adhesively bonded to the I-beam and the DIB joint. Unlike bolts and rivets, these C-clamps do not weaken the load carrying capability of the truss members.

The dimensions of the I-beam and the DIB joint will be chosen once the forces carried by the truss members are determined. Assuming that a load of 10,000 pounds is applied to the truss of FIG. 2 at joint d, the forces in the members of the truss can be easily shown to be:

$F_{ae} = F_{bc} = -5774$ lb (compression)
$F_{ed} = F_{dc} = 2887$ lb (tension)
$F_{ad} = F_{bd} = 5774$ lb (tension)
$F_{ab} = -5774$ lb (compression)

These are the forces carried by the truss members at locations away from the joints. In calculating the force distributions at the joint locations, the effect of the fiber-reinforced C-clamps has been ignored. Thus, the adhesive bonding between the I-beams and the DIB joints has been treated as the primary load transfer device. Consequently, the use of the C-clamps provides a redundant load transfer mechanism which can assure the safety and reliability of the joint design.

The dimensions of the components of the truss structure are determined by first selecting the material used for their construction. For this particular example, we assume that random short fiber-reinforced composite with 60 percent by volume of short glass fibers is used for all the components of the truss structure. The mechanical properties of this composite are assumed to be $E = 3 \times 10^6$ psi $\nu = 0.4$ $\sigma_{ult} = 30 \times 10^3$ psi where E refers to the Young's modulus, $\nu$ refers to Poisson's ratio and $\sigma_{ult}$ refers to the maximum strength of the material.

A safety factor of 2.5 was used for the design of all parts of the exemplified truss structure. For simplicity, the cross-sectional dimensions are assumed to be identical for all the members of the truss structure. The dimensions of the cross-section of the I-beam were: flange and web thicknesses of 0.4 in., a flange width of 2 in. and a beam height of 4 in. It can be shown very easily that such a cross-section is sufficient to carry the stresses at any location along the length of the members.

The forces and moments acting on member ad at the joint locations have been calculated. Comparison of the forces acting on this member with the other members of the truss shows that it is the most critical member of the truss structure. The normal forces which are acting on the two flanges of the I-beam are opposing forces of 5000 pounds each. To prevent buckling of the web of the I-beam, these two normal forces must be distributed over a sufficiently long portion of the beam. Assuming a simply supported condition for the web of the I-beam, the critical buckling stress is simply $$\sigma_{cr} = \frac{\pi^2 E(0.4)^3}{12(1-\nu^2)} \frac{1}{4^2} = 11{,}750 \text{ psi.} \quad (1)$$

Using a safety factor of 2.5, the minimum value of l (where l represents the length of the flange needed to carry the normal compressive loading)

$$l = \frac{5000 \times 2.5}{0.4 \times 11750} = 2.7 \text{ inches} \quad (2)$$

To account for stress concentrations that might arise at the two end points of l, an additional factor of safety of approximately 1.5 was used to increase the value of to 4 inches. Since these normal stresses are transmitted through the DIB joint to the other members of the truss, the distance between the curved bars or concentric arcuate flanges in the DIB joint is also chosen to be 4 inches.

The design dimensions of the DIB joint for the exemplified truss structure can be based on simple calculations. The most important parameter is the area of the flanges of the DIB joint. A sufficiently large area must be chosen for load transfer through adhesive bonding. If these stresses are too high for the adhesive used, then a larger area for the flange of the DIB joint can be chosen to lower the stress intensity at the adhesive. For the present problem, a successful adhesive bonding seems to be attainable by means of commercially available adhesives.

The dimensions for the C-clamps and the lap joints can also be determined very easily. They are, therefore, considered known quantities for this simple example.

In general, the structural beams or girders which are interconnected by the present DIB joints can have substantially any configuration. Preferably the beams have a configuration providing at least one pair of substantially flat faces which occupy adjacent sides of the beams at the beam intersections. Suitable plastic beam compositions and shapes are described in U.S. Pat. No. 4,177,306. I-beams are particularly preferred.

The beams used can be formed by substantially any procedure for embedding reinforcing fibers within a solidified plastic material. The pultrusion process is particularly suitable. Examples of suitable plastics include the commercially available epoxy and polyester resins such as epoxy impregnated graphite fibers, Rigidte fibers from Narmco Development of Celanese Corporation, glass fiber and aromatic polyamide fibers such as the aramid fiber Kelvar from DuPont, the reinforcing fiber glasses and/or glass cloths from Owens Corning Glass Company. Such plastics can contain conventional hardeners, cure rate modifiers, etc. The adhesives used in the present process can be the commercially available epoxy or polyester or the like adhesives for forming plastic structures.

What is claimed is:

1. A fiber-reinforced plastic structural joint for interconnecting fiber-reinforced plastic structural beams or girders comprising:
   a double I-beam joint containing an arch composed of a web portion bounded by, respectively, a pair of substantially arcuate flanges and a pair of converging generally flat flanges;
   said DIB joint being sized and shaped so that when the generally flat flanges are substantially parallel to converging sides of the beams to be interconnected, the arch portion of the joint is located away from the point of intersection of those beams;
   said generally flat flange portions of the DIB joint having significantly large surface areas which conform to and are capable of substantially paralleling and being adhesively bonded to surface areas of the beams being interconnected; and,
   said generally flat flange portions of the DIB joint including portions that extend beyond the web portion and have outwardly diminishing tapered T-beam cross-sections.

2. The DIB joint of claim 1 in which the beams being connected are I-beams.

3. The DIB joint of claim 1 or 2 in which generally flat plates are adhesively bonded between the abutting areas of the beams being interconnected.

4. A joint of a civil engineering structure in which beams or girders composed of fiber-reinforced plastic materials are interconnected by adhesively bonding them together with the DIB joint of claim 1.

* * * * *